(12) United States Patent
Wolfien

(10) Patent No.: US 8,569,993 B2
(45) Date of Patent: Oct. 29, 2013

(54) CAR PARKING ADMINISTRATION SYSTEM

(75) Inventor: Gerhard Wolfien, Niederelbert (DE)

(73) Assignee: Patrick Wolfien, Berlin (DE)

( * ) Notice: Subject to any disclaimer, the term of this patent is extended or adjusted under 35 U.S.C. 154(b) by 272 days.

(21) Appl. No.: 13/018,057

(22) Filed: Jan. 31, 2011

(65) Prior Publication Data

US 2011/0227533 A1 Sep. 22, 2011

(30) Foreign Application Priority Data

Mar. 22, 2010 (DE) .......................... 10 2010 012366

(51) Int. Cl.
*H02J 7/00* (2006.01)

(52) U.S. Cl.
USPC .......................................................... 320/109

(58) Field of Classification Search
USPC .......................................................... 320/109
See application file for complete search history.

(56) References Cited

U.S. PATENT DOCUMENTS

| 5,461,298 A * | 10/1995 | Lara et al. ...................... 320/109 |
| 5,563,491 A * | 10/1996 | Tseng ............................. 320/109 |
| 6,067,008 A * | 5/2000 | Smith ............................. 340/438 |
| 6,614,204 B2 * | 9/2003 | Pellegrino et al. ............ 320/109 |
| 2003/0209375 A1 * | 11/2003 | Suzuki et al. .................. 180/65.3 |
| 2009/0224724 A1 * | 9/2009 | Ma et al. ........................ 320/109 |
| 2010/0106401 A1 * | 4/2010 | Naito et al. .................... 701/201 |
| 2010/0207588 A1 * | 8/2010 | Lowenthal et al. ............ 320/165 |
| 2010/0283426 A1 * | 11/2010 | Redmann ...................... 320/109 |

* cited by examiner

Primary Examiner — M'Baye Diao
(74) *Attorney, Agent, or Firm* — Lowe Graham Jones PLLC

(57) ABSTRACT

A car parking system for charging motor vehicles with electrical energy, with at least one charging station which is capable of being coupled electrically to a motor vehicle in order to charge a charge storage unit of this motor vehicle, wherein this charging station has associated with it at least one parking space for temporarily parking the motor vehicle to be charged. According to the invention the car parking system has at least one central processing unit which is separate from the charging station and which communicates in terms of data with the charging station, wherein data characteristic of the motor vehicle are capable of being transferred by way of a communication link existing at least temporarily between the central processing unit and the charging station.

17 Claims, 2 Drawing Sheets

CAR PARKING ADMINISTRATION SYSTEM

PRIORITY CLAIM

This application claims the benefit of German Application Serial No. 10 2010 012 366.8-31 filed Mar. 22, 2010, contents of which are incorporated herein.

FIELD OF THE INVENTION

The present invention relates to a car parking administration system.

BACKGROUND OF THE INVENTION

Car parking administration systems have long been known from the prior art. In this case it is possible for example to control, by way of a controlled access with a barrier, access to a car park, in order to be able to calculate subsequently, on leaving the car park, a specified fee which usually depends upon the time spent parked. During this parking time the vehicles usually stand on the parking spaces allocated to them. In recent years efforts have been made to increase the environmental compatibility of vehicles. In the context of this development, electric vehicles are also becoming more popular, which also have electric motors in addition to or instead of engines operated by liquid fuel. A problem with using electrically operated vehicles of this type has long been that their operating range is still relatively small, so that they have to be regularly re-charged with electric current. The distribution network for charging stations of this type is still relatively scarce at present.

SUMMARY OF THE INVENTION

The present invention is directed to increasing the mobility of electric vehicles. A car parking system according to the invention for charging motor vehicles with electrical energy has at least one charging station which is capable of being coupled electrically to a motor vehicle in order to charge a charge storage unit of this motor vehicle. In this case this charging station has associated with it at least one parking space for temporarily parking the vehicle to be charged. According to the invention the car parking system has at least one central processing unit which is preferably separate from the charging station and which communicates in terms of data with the charging station, wherein data characteristic of the motor vehicle are capable of being transferred by way of a communication link existing at least temporarily between the central processing unit and the charging station. It is therefore proposed according to the invention to provide a car parking system with a function which will allow it to charge the batteries of electrically driven vehicles. In this way, in addition to buying parking time, it will also be possible to buy energy for charging the vehicles.

The charging station preferably includes an energy supply unit capable of being connected to the vehicle in order to charge the batteries of the latter.

On the basis of the concept of providing both a charging station and a central processing unit, preferably the intelligence for operating the car parking system is provided in the central processing unit, wherein this central processing unit can control for example the operation of the charging station, the payment system and the like.

The car parking system preferably has a control device which controls the access of motor vehicles to the parking space. This can be for example a barrier system which allows access to a plurality of parking spaces in a centralized manner. In addition, however, it would also be possible for one control device of this type to be assigned in each case to individual parking spaces. Instead of barrier devices it would also be possible for the control device to detect vehicles in a wireless manner for example by means of RFID and to calculate suitable parking times automatically. This could be an attractive application for company car parking systems for example.

An embodiment of the car parking system includes a plurality of charging stations which communicate with the central processing unit. In this case it may be possible for the number of the charging stations to be altered in the course of enlargements, in which case, however, more or fewer charging stations of this type can be connected to the same central processing unit. With this solution it will be possible to make allowance for the growth in the market for electrically operated vehicles and also for the corresponding follow-up investments. If for example the number of users or of necessary attachment points increases, then the follow-up costs are relatively low. It is advantageous for the charging station to be attached to a current distribution network, and this allows the supply of electrical energy to the vehicles.

In an alternative embodiment, a communication link between the central processing unit and the charging station is a wireless communication link. In this way, if the system is enlarged, additional charging stations can be provided without carrying out earth-moving work for example. Methods such as WiFi or WLAN for example can be provided as wireless links or remote data transmission (RDT). In addition it would be possible for the current supply of the central processing unit to be carried out by a link of this type.

In yet an alternative embodiment, the charging station has an electrical connection means in order to produce an electrical cable-supported connection to a motor vehicle. In this case it is possible for this connection means to be connected to corresponding standardized electrical attachment points of the vehicle. In this way for example a connection to an underside of the vehicle would be possible. In addition, it would be possible for the connection means to be connected automatically to the vehicle when the vehicle is parked and for the user for example only to have to park the vehicle at a pre-determined position. It is preferable for the charging station to be controlled by the central processing unit with which in particular it communicates. In addition, the system can have locking mechanisms which are arranged for example at the individual charging stations and which prevent unauthorized use of the electrical connection means.

In an alternative embodiment, the charging station itself can also have communication means by way of which information could be fed in to the charging station. In this context "information" is to be understood as being cash, credit cards, credit card numbers and the like, with the aid of which the user can, for example, make a payment.

The data characteristic of the motor vehicle are to be understood as being such data as are characteristic of the motor vehicle or its driver, such as for example the vehicle type, the charging state of the batteries, the time during which the vehicle is parked, the quantity of energy supplied to the motor vehicle, credit card numbers, sums of money and the like.

In a preferred embodiment, each individual charging station should not have money accepting means, but for the latter to be arranged on the central processing unit or on further units. In this way it is possible to make the charging station as simple as possible, so that in the simplest case it has only a switch device by which a current supply can be connected to the motor vehicle. In an alternative embodiment, however, the charging station may be configured to have a money accepting device, in order to receive coins or even credit cards, for example.

In yet an alternative embodiment, the charging station carries out the function of a parking clock. In particular, in this embodiment, the parking and the charging of a vehicle are combined.

In an alternative embodiment, the car parking system has a reading device by which data characteristic of persons such as for example passport numbers, credit card numbers and the like can be read in.

In yet an alternative embodiment, the charging station allows different types of current supply. In this way, for example, both 230 V/16 A normal charging and 400 V/32 A rapid charging are possible.

In an alternative embodiment, a charging station can also have an alarm device which for example displays faulty operation, destruction and the like. In addition, the charging station can also have a recognition device for the motor vehicle, such as allow for example recognition by means of RFID chips and the like. In this way it is possible for the customer to have the possibility either of having his or her vehicle charged or of only carrying out a parking procedure.

In yet an alternative embodiment, a charging station or even the central processing unit has a printer device in order to issue printed information to the user.

In an alternative embodiment, a communication device is provided by which communication is carried out between the vehicle and the charging station or between the vehicle and the central processing unit. In this way it would be possible for a vehicle identification to be provided by the car parking system, which can take as a basis for example a charge data base which contains data specific to the vehicle or the driver such as a normal or rapid charging, the maximum charging current, the connector plug assignment and so forth. A database of this type can also be administered and updated by way of an RDT.

In the case of corporate solutions or self-contained groups of users, such as for example housing associations, a separate existing infrastructure, i.e. a computer system, can be used. In this case the charging stations can transfer the data by way of RDT.

In addition, an information output device can be provided which displays to the user information specific to the charging station or the car parking system, for example where the next available charging station may be found, this being possible by way of announcements such as "space occupied"/"space vacant"/"space out of order" and preferably also on a platform interactive with the Internet. In addition, it would also be possible for information of this type to be incorporated into a satellite navigation system of a vehicle.

If the apparatus has a coin accepting device, in this case it would be possible for coins or monetary units of foreign currencies also to be accepted.

In yet an alternative embodiment, the car parking system has a time measuring device. In this case both the charging station and the central processing unit can have a time measuring device of this type, which determines how long a specified motor vehicle has stood on a specified parking space or possibly for what period of time it has been charged. In addition, the car parking system can also have a current consumption measurement device which determines the current dispensed to a vehicle by way of a specified charging station. On the basis of this current, corresponding costs can be calculated for the vehicle user.

In addition, it would also be possible for the above-mentioned alarm unit to emit the alarm both directly and by way of RDT means. It is advantageous for the charging station to have an information input device, in which case this information input device can have for example a plurality of buttons, numeric keyboards for entering PIN numbers, a language support means, a display device for issuing information to the user and the like.

Various options are also possible for the payment system, such as for example coin changers, credit card accepting units, smart card reading units with or without a pictogram, RFID units with or without a pictogram, banknote readers, foreign currency accepting units and the like.

In an alternative embodiment, the charging stations have pre-set electrical units, such as for example residual current circuit breakers, cooling devices, heating means and fans. In addition, the charging stations have a consumption data transmission device in order to pass on the aforesaid data to the central processing unit.

Different variants of remote data transmission are possible, such as for example GPRS to the central processing unit, UMTS to the central processing unit, SMS, WLAN or language output to the central processing unit. In addition, the information can also be passed on to the charging stations or satellites by way of Wi-Fi or radio or WLAN. In addition, communication to the end users is also possible, for example by way of the Internet.

In yet an alternative embodiment, a plurality of parking spaces is allocated to a charging station. It would also be possible for no charging stations to be allocated to individual parking spaces and for these parking spaces to be envisaged for conventional vehicles without the corresponding possibility of charging.

In addition, the present invention relates to a method of operating a car parking facility or a car parking system and, in particular, a car parking system of the type described above, in which the car parking facility has at least one charging station for electrically charging the batteries of a motor vehicle, wherein controlled access to a parking space which is allocated to the charging station is allowed to the motor vehicle, wherein the batteries of the vehicle are charged at least temporarily while the vehicle is parked on the parking space.

In this case "controlled access" preferably means that it is possible to detect access to the parking space and in particular also occupancy time of the vehicle on the parking space. In this case, as mentioned above, barrier systems can be used but also systems which detect the vehicle in question individually. In addition, "controlled access" is preferably to be understood as being that access to the parking spaces can also be prevented under specific circumstances.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
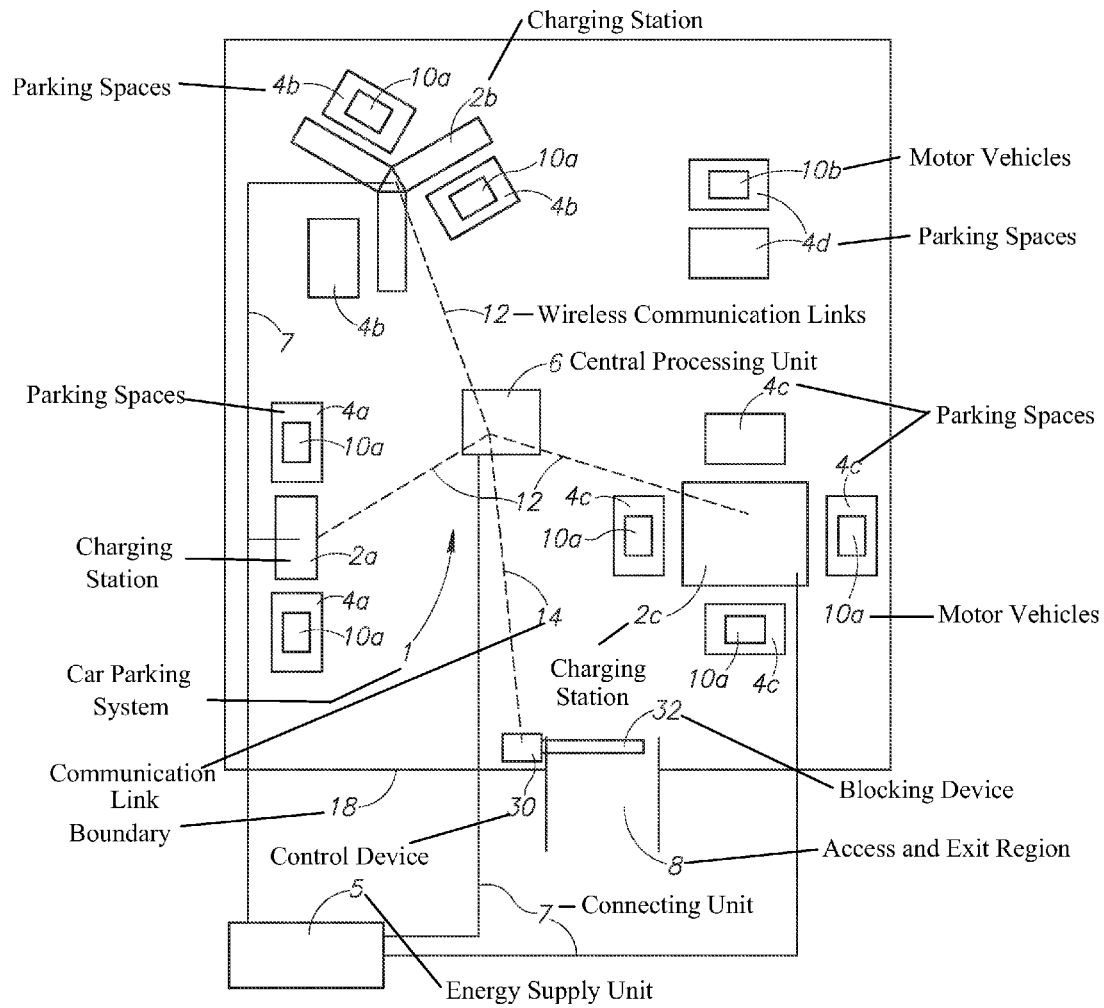
FIG. 1 is a diagrammatic illustration of a car parking system according to the present invention.

FIG. 1 is a diagrammatic illustration of a car parking system 1 according to the invention. In this case this car parking system 1 has three charging stations 2a, 2b, 2c, two parking spaces 4a being associated with charging station 2a, three parking spaces 4b being associated with charging station 2b and four parking spaces 4c being associated with charging station 2c. The number of the parking spaces, however, which are allocated to each charging station 2 in each case, can be varied. Motor vehicles 10a are present on some of the aforesaid parking spaces 4a, 4b, 4c. In addition, further parking spaces 4d are provided which, however, are not allocated to a charging station 2 and which are thus suitable for conventional cars 10b, for example.

The car parking system 1 has an energy supply unit 5, such as for example a public energy distribution network, by way of which the individual charging stations 2 are supplied with electrical energy by way of connecting lines 7. In this case the individual charging stations 2 are arranged in a stationary manner.

The car parking system 1 preferably includes a central processing unit 6 which communicates with the individual charging stations 2. The intelligence of the car parking system 1 is located in this central processing unit 6. The system further includes wireless communication links 12, by way of which the central processing unit 6 communicates with the individual charging stations 2. This may be, in particular, wireless connections, such as Wi-Fi connections, Bluetooth connections, Internet connections and the like.

The system preferably includes a boundary 18 which separates the individual parking spaces 4 from the environment. The access or exit of the individual vehicles is possible only by way of an access or exit area 8. This boundary can be for example walls or similar boundary elements which prevent access by a motor vehicle. In addition, it is also possible (for example in the case of multi-storey car parks) for walls of buildings to be involved. In particular, the boundary serves the purpose of permitting motor vehicles only a defined access or exit by way of pre-set access paths.

A control device 30 controls the access of vehicles 10 to the individual parking spaces 4. In this case it is preferably possible for each vehicle which passes through the car parking system to be registered. A blocking device 32, such as a barrier for example, allows vehicles to pass only under a specified pre-condition, for example if the drivers have pulled out a parking ticket. The control device 30 also communicates with the central processing unit 6 by way of a communication device 14. It would also be possible for the control device 30 and the central processing unit 6 to be accommodated in a common housing.

Figure 2:
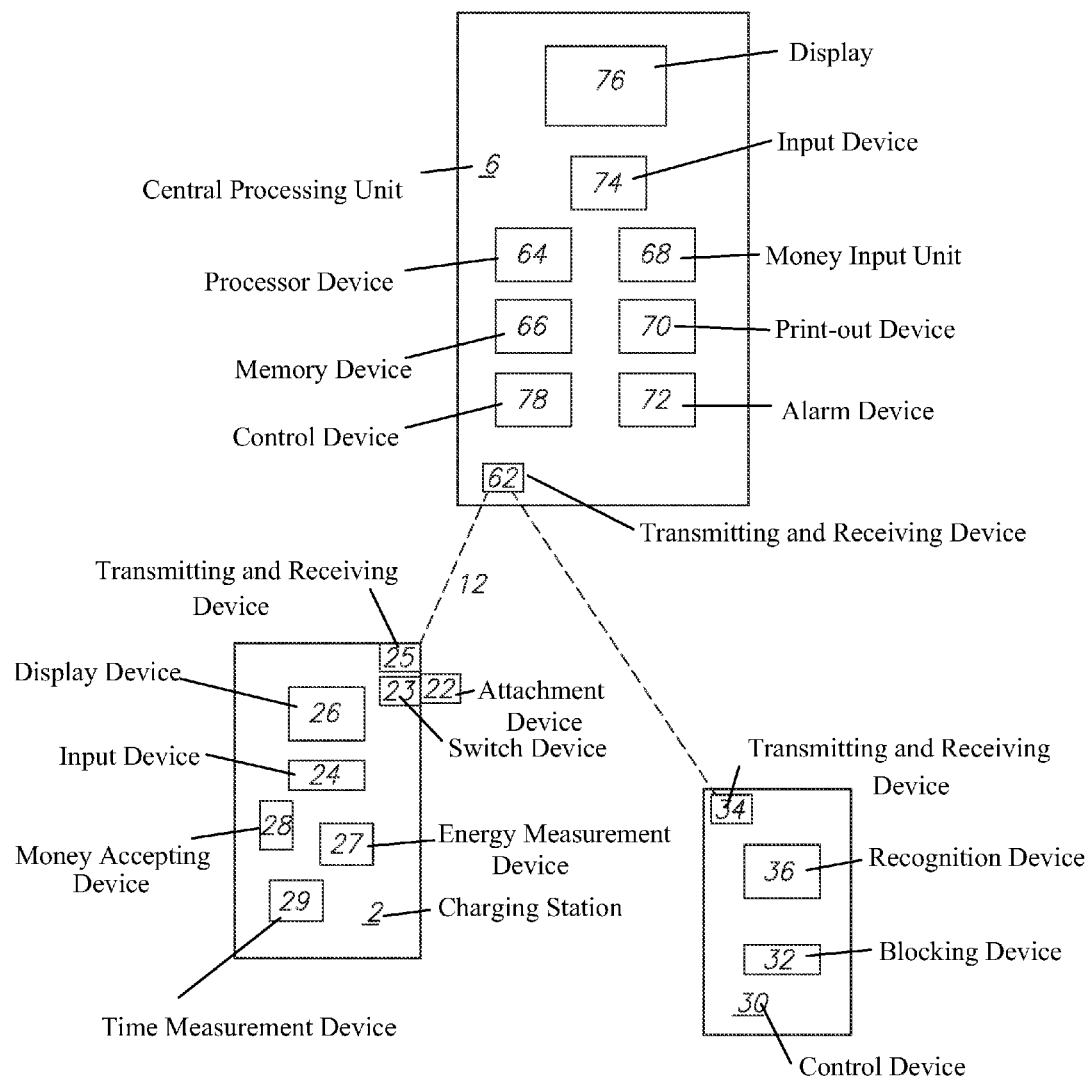
FIG. 2 is a block diagram of the individual components of the car parking system.

FIG. 2 illustrates the interaction of a charging station 2, the central processing unit 6 and optionally the control device 30. With reference to FIGS. 1 and 2, if a vehicle has entered a specified parking space 4, the user can decide whether he or she also wishes to carry out a charging procedure at the same time. For this purpose he or she can connect an attachment device 22 for example to his or her vehicle, so that the motor vehicle is supplied with electric current. In addition, the charging station 2 can have a display device 26 by way of which the users can read off specific data, for example parking times, the power dispensed by the charging station and the like.

It is possible for the user, by way of an input apparatus 24 such as for example a keyboard, to enter information into the charging station 2, for example as to how long a specific charging procedure should last, with which electrical parameters (amperage, voltage) the charging should be carried out, which type of vehicle he or she has and the like. The charging station 2 may include a money accepting device 28 such as for example coin slots, banknote accepting means, or even a reading device for the recognition of money cards. The station may also include a power measurement device 27 which determines the energy dispensed to the motor vehicle.

In addition, it is also possible for a time measuring device 29 to be provided, which determines a specified parking time. The charging station 2 preferably includes a transmitting and receiving device 25 which delivers data to the central processing unit 6 by way of a communication link 12. This can be for example data for a dispensed quantity of energy, data specific to the vehicle or the user such as for example credit cards and the like, and it may be information on the quantity of money inserted and the like.

Conversely, the central processing unit 6 can also control the charging station 2, in order for example to release a current supply for a motor vehicle. The charging station therefore additionally has a switch device 23 by which a switching procedure can be controlled, in order to supply a motor vehicle with electrical energy.

In a preferred embodiment, the central processing unit 6 advantageously has a central control device 78 for controlling the charging station 2. In addition, the central processing unit 6 has in this case a display device, such as a display 76 by way of which the user or also the staff of the car parking system can read off information, such as for example the number of the charging stations occupied and the like. In this case too, data can be fed into the central processing unit 6 by way of an input device 74. Furthermore, it is also possible for an increasing number of charging stations to be attached to a central processing unit 6, in which case the central processing unit 6 can also communicate with these further charging stations 2 (not shown) by way of a data transmitting and receiving device 62.

The central processing unit includes a storage device 66 in which for example a data base which contains a plurality of data types can be filed. In addition, it would also be possible for data specific to the customer to be stored with this data base, such as for example the vehicles of the individual authorized employees in a company network or on a company car park.

In this embodiment, the central processing unit includes a money input unit 68, which is optional, by way of which money in the form of coins or notes and also in the form of credit cards can be introduced. The central processing unit may also include a print-out device 70, such as a printer, which for example can print out receipts for the users. Alarms can be emitted by way of the alarm device 72, for example if a charging station 2 is incorrectly operated or if it has been damaged. In addition, information as to how many parking spaces are already occupied can also be stored in the control device 78.

The control device 30 controls access to the car parking system. This control device can have a blocking device 32 such as for example a barrier which closes off or opens up access as required. The control device 30 may also include a recognition device 36 which for example, by way of RFID or other methods, recognizes an incoming vehicle or for example just recognizes only one specified type of vehicle. In this way it would be possible to direct the driver, in a manner dependent upon the type of vehicle, to drive to a specified charging station 2 which is suitable for his or her type of vehicle. Further, the control device 30 may include a transmitting and receiving device 34 by means of which the control device communicates with the central processing unit 6.

In an alternative embodiment, the central processing unit 6 delivers information to further central processing units or even information over the Internet or to satellite navigation systems, so that vehicles may be guided in a purposeful manner to those car parking systems in which free parking spaces are still present.

In yet an alternative embodiment, the control device 30 also to communicate directly with the individual charging stations 2. In addition, the charging stations 2 can have signaling means such as for example lighting means which in each case display a state of occupation to vehicle drivers. In addition, it is also possible, with the display device 26, to display information as to whether a specified vehicle is merely parked on the parking space associated with it or whether it is also additionally being charged with electrical energy.

The central processing unit 6 also has, in addition, a processor device 64 which calculates the respective amount of energy dispensed for each vehicle charged with electrical energy at a charging station 2 and invoices the user. During the exit from the car parking system the control device 30 can again check to see whether the correct sum has been paid and only in the positive case allows an exit from the car parking system.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A car parking system for charging motor vehicles with electrical energy, said car parking system has at least one central processing unit which is separate from charging stations and which communicates in terms of data with the charging stations, wherein data characteristic of the motor vehicle are capable of being transferred by way of a communication link existing at least temporarily between the central processing unit and the respective charging station, said car parking system comprising:
   a plurality of charging stations which are capable of being coupled electrically to a motor vehicle in order to charge a charge storage unit of the motor vehicle;
   a plurality of parking spaces for temporarily parking;
   a plurality of parking spaces for temporarily parking while charging the motor vehicle;
   at least one alarm device which displays faulty operation, destruction and the like; and
   means to control access to an area comprising the plurality of temporary parking spaces and the plurality of temporary parking spaces while charging.

2. The car parking system according to claim 1, further comprising a plurality of charging stations which communicate with the central processing unit.

3. The car parking system according to claim 1, wherein the communication link between the central processing unit and the charging station is a wireless communication link.

4. The car parking system according to claim 1, wherein the charging station has an electrical connection means in order to produce an electrical cable-supported connection to a motor vehicle.

5. The car parking system according to claim 1, wherein the charging station has communication means by way of which information can be fed into the charging station.

6. The car parking system according to claim 1, wherein the charging station has a money accepting device.

7. The car parking system according to claim 1, characterized in that the charging station carries out the function of a parking clock.

8. The car parking system according to claim 1, wherein the car parking system has a time-measuring device.

9. A method of operating a car parking system having a plurality of charging stations for electrically charging the batteries of motor vehicles, the charging stations are in communication with a central processing unit, and the car parking system having a multiple number of parking spaces for temporarily parking, the method of operating the car parking system comprising:
   providing the motor vehicle access to parking spaces based upon an operational condition being met;
   providing the motor vehicle access to a parking space which is allocated to at least one charging station;
   providing the motor vehicle access to electrically coupling to at least one charging station in order to charge a charge storage unit of the motor vehicle;
   transferring data characteristics of the motor vehicle between the charging station and the central processing unit;
   providing the possibility to at least temporary charging the charge storage unit of the motor vehicle while the motor vehicle is parked at the parking space; and
   at least one alarm device which displays faulty operation, destruction and the like.

10. The method of claim 9, further comprising monitoring the time spent by the motor vehicle at the parking space via a time-measuring device associated with at least one of the charging station or the central processing unit.

11. The method of claim 9, further comprising accepting payment for the use of the parking space or charging the charge storage unit at at least one of the charging station or the central processing unit.

12. A car parking system for charging a motor vehicle having a charge storage unit with electrical energy, comprising:
   a plurality of charging stations configured to be coupled electrically to a motor vehicle in order to charge the storage unit of the motor vehicle;
   a plurality of parking spaces associated with the charging station for temporarily parking the motor vehicle to be charged;
   a plurality number of parking spaces not associated with the charging station for temporarily parking the motor vehicle;
   at least one central processing unit in communication with the charging station, wherein the central processing unit is configured to receive data characteristic of the motor vehicle;
   at least one payment receipt device configured to accept payment for at least one of temporarily parking the vehicle or charging the charge storage unit; and
   at least one alarm device which displays faulty operation, destruction and the like.

13. The car parking system according to claim 12, further comprising a control device which controls the access of motor vehicles to the parking space.

14. The car parking system according to claim 12, further comprising a plurality of charging stations which communicate with the central processing unit.

15. The car parking system according to claim 12, wherein the communication link between the central processing unit and the charging station is a wireless communication link.

16. The car parking system according to claim 12, characterized in that the charging station carries out the function of a parking clock.

17. The car parking system according to claim 12, wherein the car parking system has a time-measuring device.

* * * * *